United States Patent [19]

Kader

[11] 4,206,498

[45] Jun. 3, 1980

[54] SAFETY LIGHT FOR ROAD VEHICLES

[76] Inventor: John F. Kader, 464 E. 33rd St., Erie, Pa. 16504

[21] Appl. No.: 886,049

[22] Filed: Mar. 13, 1978

[51] Int. Cl.² .............................................. B62J 5/00
[52] U.S. Cl. ............................................... 362/72
[58] Field of Search ................ 362/72, 211, 212, 214

[56] References Cited

U.S. PATENT DOCUMENTS

| | | | |
|---|---|---|---|
| 2,088,501 | 7/1937 | Arbuckle | 362/212 X |
| 3,696,334 | 10/1972 | Demeter | 362/72 X |
| 3,904,920 | 9/1975 | Griffith | 362/72 X |
| 3,908,144 | 9/1975 | Rudd | 362/214 X |
| 4,011,443 | 3/1977 | Smith et al. | 362/72 X |
| 4,019,171 | 4/1977 | Martelet | 362/72 X |
| 4,051,361 | 9/1977 | Lichon et al. | 362/211 |

FOREIGN PATENT DOCUMENTS 1252176 12/1960 France ....................................... 362/72

*Primary Examiner*—Peter A. Nelson
*Attorney, Agent, or Firm*—Charles L. Lovercheck

[57] ABSTRACT

A lamp for a motorcycle or the like comprising a glass envelope divided into a first compartment and a second compartment with a flasher element in the first compartment and a driving light element in the second compartment, a lens in front of the light elements that has a part colored amber in front of the flasher and a clear part in front of the driving light element. A flasher element is connected to the flasher light so that the flasher light can flash an amber color when the vehicle is moving down the road and has a steady clear light when needed.

2 Claims, 3 Drawing Figures

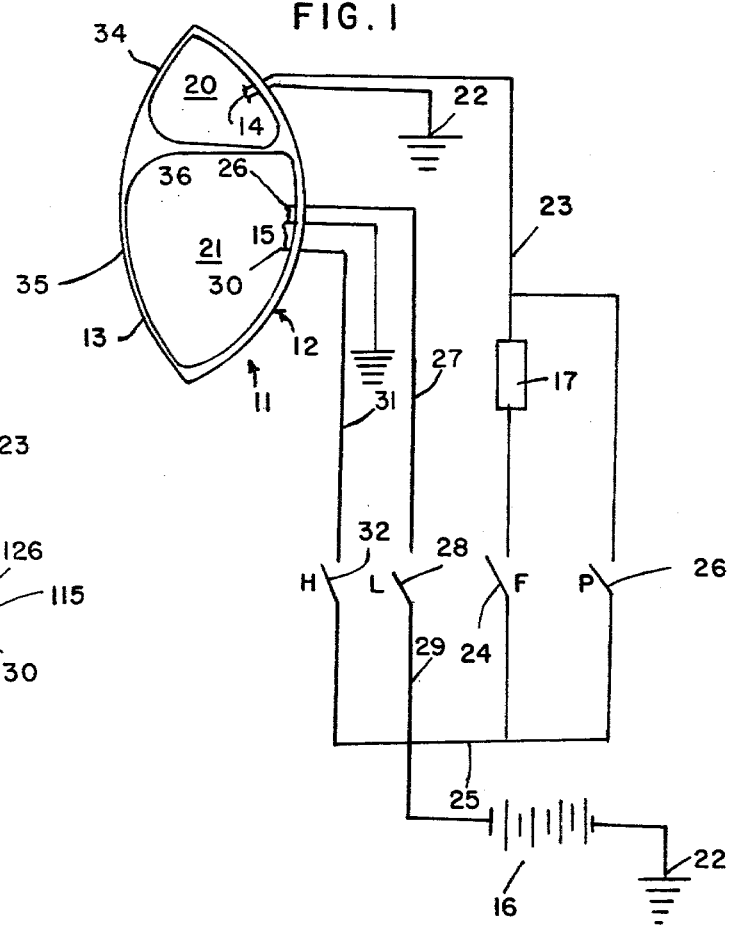
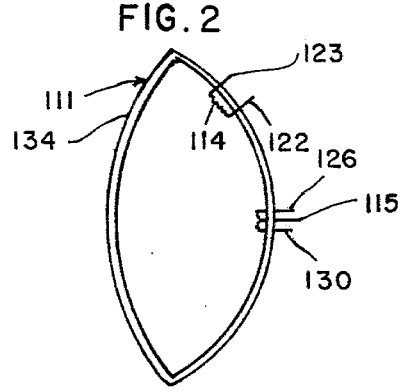
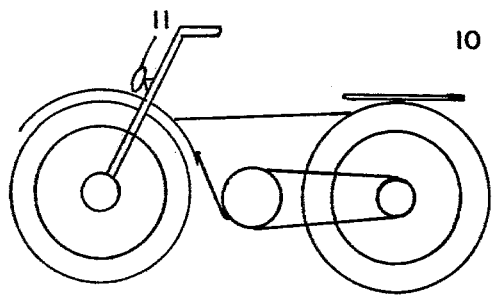

SAFETY LIGHT FOR ROAD VEHICLES

OBJECTS OF THE INVENTION

It is an object of the invention to provide an improved light for use on a motorcycle.

Another object of the invention is to provide a single light envelope containing a flasher light element with amber colored lens and a driving light element with clear lens.

Another object of the invention is to provide a new combination flashing light and motorcycle, wherein said combination is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

FIG. 1 is a cross-sectional view of the lamp and circuit according to the invention.

FIG. 2 is a cross-sectional view of a lamp according to another embodiment of the invention.

FIG. 3 is a side view of a lamp according to the invention mounted on a motorcycle.

DETAILED DESCRIPTION OF THE DRAWINGS

Now, with more particular reference to the drawings, the motorcycle indicated generally at 10 is of a conventional type having a light 11. The headlight is shown in the embodiment of FIG. 1 having a glass envelope 12 closed at the front by means of lens 13. The lens has a partition extending backward providing the light into a first compartment 20 and a second compartment 21. The first compartment 20 has the flasher light element 14 in it and the second compartment has the driving light element 15 in it. These light elements 14 and 15 may be incandescent elements. The light elements 14 and 15 each have one side connected to a ground element 22 and through the switches shown to the battery 16, which provide a power source for the light.

The flasher light element 14 is connected through the line 23 to the flasher element 17 and through the flasher switch 24 to the line 25 to the storage battery 16. The flasher element may, likewise, be connected to the storage battery 16 through the switch 26 which may be turned on as desired.

The upper headlight element 26 is connected through the line 27 and switch 28 through line 29 to the common line 25 and then to the storage battery 16. The lower element 30 is connected through line 31 and switch 32 to the common line 25 that is connected to the storage battery 16. Thus, the operator may select the high beam or the low beam light by means of the switches 30. He may turn the light element 14 on continuously by switch 26 or turn on through the flasher element 17 to attract attention of other drivers.

The lens 13 has its upper part 34 preferably colored amber and the lwere clear part of the lens 35. The upper compartment 20 and the lower compartment 21 are separated from each other by the partition 36.

FIG. 2 shows a sealed beam headlight with the upper part of the lens painted or colored amber and the lower part clear. A filament 114 can be connected to a flasher and filament 126, 115, 130 be connected to headlight switches.

This idea was thought of during an interview with a police officer and a motorcycle driver who was asked why the death rate was so high for the motorcyclist and he said the motorist doesn't see us. This is when I thought of a new type of sealed beam headlight with a built-in amber flasher used for daytime driving. This headlight can be used on motorcycles, locomotives, transit cars, busses, or wherever the law requires that headlights be used. This way the on-coming motorist will see them, especially on a sunny or a foggy day.

This headlight can be made in any shape or size for wherever used. This headlight can be made in one unit, with a separate compartment for the flasher filament which is isolated from the white light. The flasher compartment will have an amber lens, which is operated by a turn signal flasher and can be turned on or off by a switch. Due to the one piece construction of the light disclosed herein, it can be used the same as original equipment. When this light is in use, the on-coming motorist will observe them when this amber light is flashing, thus eliminating injury and death. This headlight will be known as a safety light. For details see drawing.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a motorcycle and a headlight, said headlight comprising,
   a single hermetically sealed glass envelope having a partition dividing said envelope into a first part and a second part and hermetically sealed thereto,
   a flasher light element in the first part of said envelope,
   a driving light element in the second part of said envelope,
   a power source,
   a flasher element connecting said flasher light element to said power source and a switch means connecting said driver light element directly to said power source,
   and means supporting said light envelope on said motorcycle.

2. The combination recited in claim 1 wherein said lens in front of said flasher element is colored generally an amber color on said lens.